Oct. 28, 1924.  1,513,717
A. MILLS
COUPLING MEANS FOR AUTOMOBILE TRAILERS
Filed May 23, 1921   2 Sheets-Sheet 2

Arthur Mills
INVENTOR,

WITNESSES
BY
ATTORNEY.

Patented Oct. 28, 1924.

1,513,717

UNITED STATES PATENT OFFICE.

ARTHUR MILLS, OF SACRAMENTO, CALIFORNIA.

COUPLING MEANS FOR AUTOMOBILE TRAILERS.

Application filed May 23, 1921. Serial No. 471,591.

*To all whom it may concern:*

Be it known that I, ARTHUR MILLS, a citizen of the United States, residing at Sacramento, in the county of Sacramento and State of California, have invented a new and useful Coupling Means for Automobile Trailers, of which the following is a specification.

This invention has reference to coupling devices for automobile trailers and its object is to provide a structure for carrying various articles which may be attached to the rear of an automobile without danger of the trailer buckling or upsetting when the automobile is backed.

In accordance with the invention, the trailer is provided with two connections to the vehicle drawing it, such connections being independent of each other and elastically connected to the vehicle so that jerking, due to sudden starting of the vehicle, is avoided; and means is provided to drag in contact with the ground whereby the trailer is prevented from running down hill when the vehicle and trailer are climbing a hill and it becomes necessary for the driver of the vehicle to release the brakes before throwing in the clutch.

The invention will be best understood from a consideration of the following detailed description taken in connection with the accompanying drawings forming a part of this specification, with the understanding, however, that the invention is not confined to any strict conformity with the showing of the drawings, but may be changed and modified so long as such changes and modifications mark no material departure from the salient features of the invention as expressed in the appended claims.

In the drawings:—

Figure 1:
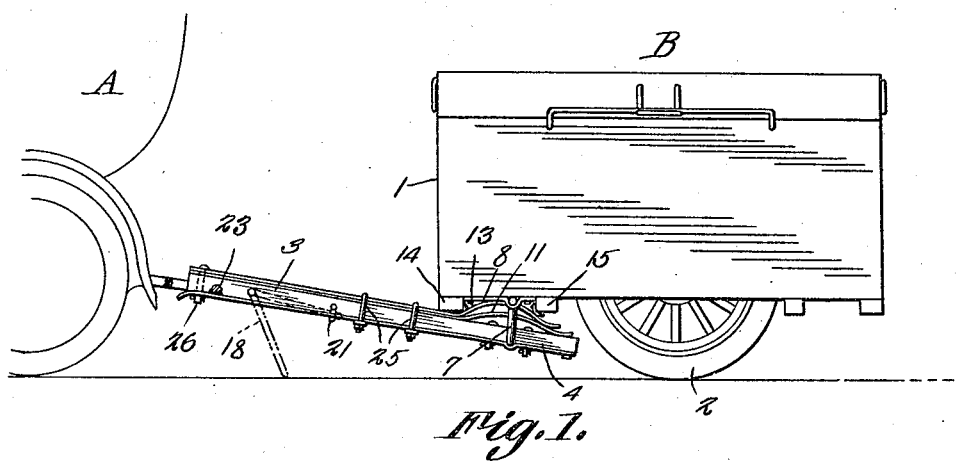
Fig. 1 is an elevation, with some parts in section, of the rear end of an automobile and showing a trailer attached thereto by a coupling device embodying the invention.
Figure 2:
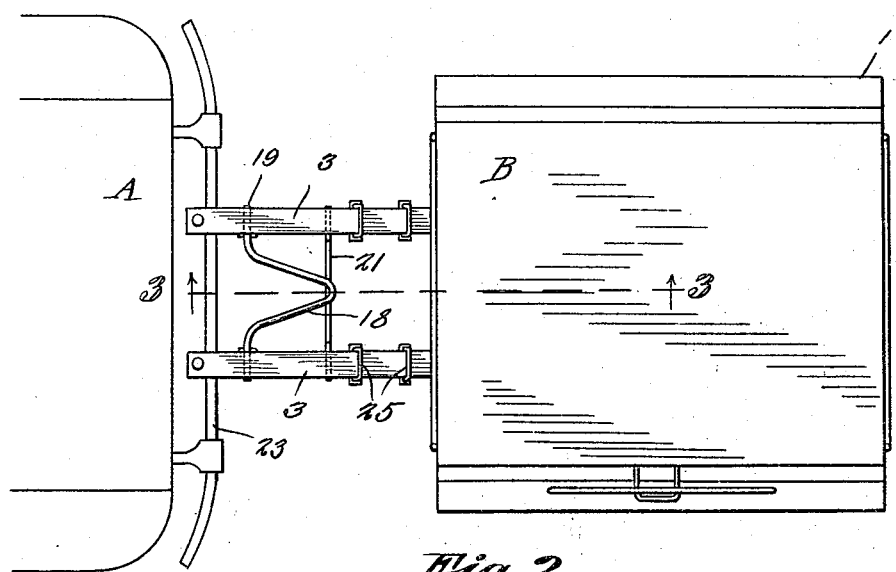
Fig. 2 is a plan view of the parts disclosed in Fig. 1.

Referring to the drawings, there is shown in Figs. 1 and 2, a small portion of an automobile A, and a trailer B, the specific structure of which, in most part, does not enter into the invention, and consequently is neither shown nor described.

Figure 3:
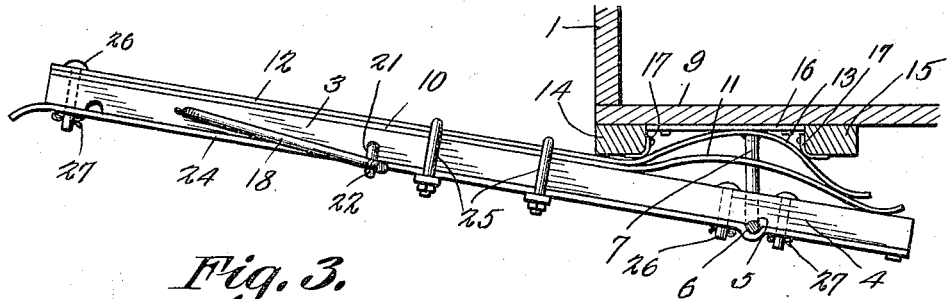
Fig. 3 is a section on the line 3—3 of Fig. 2, drawn on a larger scale and omitting some parts illustrated in Fig. 2.
Figure 4:
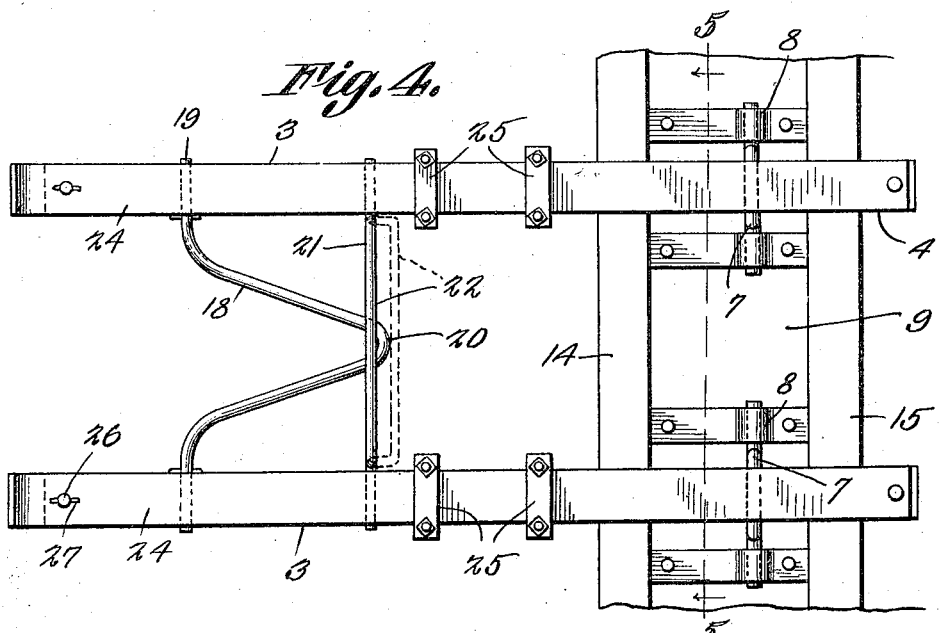
Fig. 4 is a plan view of the structure shown in Fig. 3.
Figure 5:
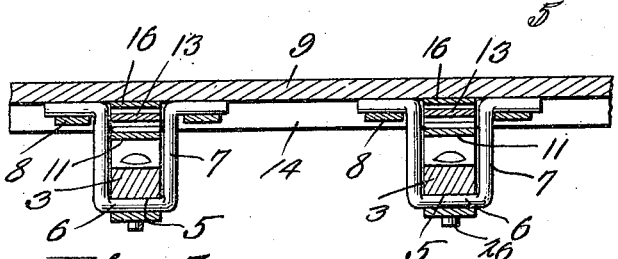
Fig. 5 is a section on the line 5—5 of Fig. 4.

Generally, the trailer B comprises a body 1, supporting wheels 2, and coupling means in the form of poles or draft devices 3, there being two such draft devices on opposite sides of the longitudinal center line of the trailer. Each draft device comprises an elongated pole with the rear end 4 recessed on the under face, as shown at 5, (Figs. 3 and 5) partially to house a crank portion 6 of a rocker 7, which may be U-shaped as shown. Each rocker has its upper ends bent outwardly and mounted in bearings 8, fastened to the under side or floor 9 of the trailer B, in any suitable manner, there being two such rockers in alinement crosswise of the trailer and each rocker and draft pole being independent of the other one. Thus there is provided a freedom of movement between the two draft poles, which contributes to the flexibility of the draft and which prevents any tendency of the trailer to overturn, especially on sharp turns.

Secured to the upper face of each draft pole 3 is a metallic strip 10 terminating beneath the trailer in an upwardly curved extension 11, and lying on and fast to the strip 10 is another similar strip 12 also upwardly curved but to a greater extent as indicated at 13, the two curved portions 11 and 13 constituting springs and both rising into a space between two separated cross bars 14 and 15, fast to the floor of the trailer on the under surface thereof.

Between the bars 14 and 15 a wear plate 16 is secured to the bottom of the trailer so as to be engaged by the bowed portion 13 of the strip 12, and the inner corners of the cross strips 14 and 15 are preferably covered by hard leather buffers 17, not only to avoid wear but to protect the springs. The tendency of the bowed portions 11 and 13 is to uphold the outer end of each draft pole 3, but this may be only partially accomplished and the normal tendency of the pole 3, when otherwise unsupported, is to drop at its forward end toward the ground.

The forward ends of the poles 3 together support a yoke member 18 having alined and oppositely-directed outer ends journaled in the respective poles 3, as shown at 19, with the intermediate portion 20 of the yoke midway between the poles.

Also extending crosswise of the poles is a rod support 21 having an intermediate drop portion 22 to sustain the mid-portion 20 of the yoke 18 when the latter is to be held in the elevated position, which is the position assumed by the yoke 18 when the trailer is being drawn along the roadway by the automobile.

In the event of the stopping of the automobile on a hill, the support 21 moves out of the path of the yoke 18, thus permitting the intermediate portion 20 of the yoke to drop toward the roadway and then the yoke 18 will support the draft poles in the partially elevated position so that with the draft poles fast to the rear of the automobile, say by being traversed by the rear bumper 23 of the automobile, the yoke 18 will assume the position shown in dotted lines in Fig. 1. If, now, the brakes of the automobile A be released, the yoke 18 will, at its intermediate portion, dig into the ground of the roadway sufficiently to prevent the trailer, and through it the automobile, from backing down hill. This gives the driver of the vehicle A a chance to release the brakes before throwing in the clutch in order to start the vehicle after having stopped it on an up-grade. After having started the engine of the automobile, the yoke 18 may be lifted from the ground and engaged under the cross bar 21 for sustaining it during travel.

In order to protect the under face of each draft pole 3 there is provided an extended strip 24 held to the draft pole 3 by clips 25 and intermediate and end bolts 26, the latter being secured by cotter pins 27 instead of nuts, so as to facilitate the application of the draft poles to the rockers 7 and to the strips 10, 12 and 24.

What is claimed is:

1. In an automobile trailer, coupling means therefor to attach the trailer to an automobile, comprising a pair of poles arranged on opposite sides of the longitudinal center line of the trailer and having a yoke journaled in and connecting them, said yoke having an intermediately V-shaped portion between the poles and being movable to automatically drop by gravity into engagement with the ground to hold the trailer against retrograde movement on a down grade should the automobile stop on a hill.

2. In an automobile trailer, coupling means therefor to attach the trailer to an automobile, comprising a pair of poles arranged on opposite sides of the longitudinal center line of the trailer and having a movable element journaled in the poles, said element having a portion to engage the ground, and means for holding said element in its normal position out of engagement with the ground, said means moving out of holding engagement with said element should the automobile stop on a hill, said element then dropping by gravity to cause the engaging portion to contact with the ground, whereupon the releasing of the brakes of the automobile causes the engaging portion to dig into the ground to prevent both the trailer and automobile from backing down hill.

3. In an automobile trailer, coupling means therefor to attach the trailer to an automobile, comprising a pair of poles movable independently of each other and arranged on opposite sides of the longitudinal center line of the trailer and having a yoke journaled in and connecting them, said yoke having an intermediately V-shaped portion, and means connecting the poles and engaging the V-shaped portion for holding the yoke in its normal position.

4. In an automobile trailer, coupling means therefor to attach the trailer to an automobile, comprising a pair of poles arranged on opposite sides of the longitudinal center line of the trailer and having a yoke journaled in and connecting them and having a portion to engage the ground, and a rod mounted on the poles in rear of the yoke and having a drop portion to hold the yoke in its elevated position, said yoke being movable to drop by gravity into engagement with the ground upon the movement of said drop portion out of holding engagement with the yoke, when the automobile stops on a hill.

5. In an automobile trailer, a pair of laterally spaced draft poles arranged on opposite sides of the longitudinal center line of the trailer, a crank connection between the rear end of each pole and the forward end of the trailer, and elastic means on the rear end of the poles and coacting with the crank connections to cause the crank connections to yield to a forward pull and to be restored to normal position by the elasticity of said means.

6. In an automobile trailer, a pair of laterally spaced draft poles arranged on opposite sides of the longitudinal center line of the trailer, a crank connection between the rear end of each pole and the forward end of the trailer, and elastic means on the rear end of the poles and coacting with the crank connections to cause the crank connections to yield to a forward pull and to be restored to normal position by the elasticity of said means, said elastic means consisting of a pair of bowed springs secured to each pole and engaging with the trailer.

7. In an automobile trailer, a pair of laterally spaced draft poles, a crank connection between the rear end of each pole and the forward end of the trailer, and elastic means on the rear end of the poles and coacting with the crank connections to cause the crank connections to yield to a forward pull and to be restored to normal position by the elasticity of said means, said elastic means comprising a bowed spring engaging with the pole and with the trailer.

8. In an automobile trailer, a draft pole, a transversely arranged crank connection between the rear end of said pole and the forward end of the trailer, said connection suspending the pole from the bottom of the trailer, and elastic means acting on the rear end of the pole and engaging the bottom of the trailer to assist in supporting the pole, said elastic means coacting with the crank connection to cause said connection to yield to a forward pull and to be restored to normal position by the elasticity of said means.

In testimony, that I claim the foregoing as my own, I have hereto affixed my signature.

ARTHUR MILLS.